US012179689B1

(12) United States Patent
Kim

(10) Patent No.: US 12,179,689 B1
(45) Date of Patent: Dec. 31, 2024

(54) AIRBAG UNIT

(71) Applicant: HYUNDAI MOBIS CO., LTD., Seoul (KR)

(72) Inventor: Jae Hyun Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/679,781

(22) Filed: May 31, 2024

(30) Foreign Application Priority Data

Nov. 6, 2023 (KR) .................. 10-2023-0151569

(51) Int. Cl.
*B60R 21/2338* (2011.01)
*B60R 21/203* (2006.01)

(52) U.S. Cl.
CPC ........ *B60R 21/2338* (2013.01); *B60R 21/203* (2013.01); *B60R 2021/23382* (2013.01); *B60R 2021/23386* (2013.01)

(58) Field of Classification Search
CPC ...... B60R 21/2338; B60R 2021/23386; B60R 21/203
See application file for complete search history.

(56) References Cited

U.S. PATENT DOCUMENTS

| | | | |
|---|---|---|---|
| 7,152,875 B2 * | 12/2006 | Kai ..................... | B60R 21/2338 |
| | | | 280/739 |
| 10,214,174 B2 * | 2/2019 | Zhang .................. | B60R 21/203 |
| 11,518,335 B2 * | 12/2022 | Osterfeld ............ | B60R 21/2338 |
| 12,109,967 B2 * | 10/2024 | Shimizu ............... | B60R 21/207 |

* cited by examiner

*Primary Examiner* — Paul N Dickson
*Assistant Examiner* — Tiffany L Webb
(74) *Attorney, Agent, or Firm* — NSIP Law

(57) ABSTRACT

An airbag unit includes an airbag to be deployed toward a driver and a tether connected to an outer side of the airbag to support the airbag. The airbag includes a front panel disposed on a driver side and a rear panel connected to a rear surface of the front panel. A tether groove is disposed in a recessed portion of the airbag at a lower side of the airbag, at least a portion of the tether is disposed on the front panel, the tether passes through the tether groove, and both ends of the tether are fixed to the rear panel so as to support the airbag when the airbag is deployed.

10 Claims, 5 Drawing Sheets

AIRBAG UNIT

CROSS-REFERENCE TO RELATED APPLICATION

This application claims priority to and the benefit of Korean Patent Application No. 10-2023-0151569, filed on Nov. 6, 2023, the disclosure of which is incorporated herein by reference in its entirety.

BACKGROUND

Field of the Invention

The present invention relates to an airbag unit, and more specifically, to an airbag unit of a reduced steering wheel capable of supporting a driver without being pushed forward.

Discussion of Related Art

Generally, a steering wheel for steering vehicle wheels is disposed in front of a driver's seat of a vehicle. The steering wheel may include a rim for the driver to grip and control steering and a hub disposed inside the rim to control the vehicle's headlights or sound a horn.

The conventional steering wheel typically has a circular rim, but recently, a steering wheel having a reduced rim has been developed for various purposes such as improving the visibility of instrument panels and securing the interior space of vehicles. As a representative example, a yoke steering wheel, which includes a rim with a section cut out on one side rather than a circular shape, or a steering wheel, which includes a rim in which the top and bottom are reduced, has been developed.

However, when an airbag is installed in the reduced steering wheel, the airbag deployed due to an external impact may not be supported by the cut-out section or reduced portion of the rim. In such cases, the airbag may be pushed in the direction in which the driver collides with the airbag when the driver collides with the airbag, which may worsen the driver's injuries.

SUMMARY

The present invention is directed to providing an airbag unit capable of safely supporting a driver on a reduced steering wheel.

The problems to be solved by the present invention are not limited to the above-described problems, and other problems not mentioned here will be clearly understood by those skilled in the art from the following disclosure.

According to an aspect of the present invention, there is provided an airbag unit which includes an airbag configured to be deployed toward a driver and a tether connected to an outer side of the airbag to support the airbag.

The airbag includes a front panel disposed on a driver side and a rear panel connected to a rear surface of the front panel. A tether groove is disposed in a recessed portion of the airbag at a lower side of the airbag, at least a portion of the tether is disposed on the front panel, the tether passes through the tether groove, and both ends of the tether are fixed to the rear panel so as to support the airbag when the airbag is deployed.

The airbag unit may include a guide part through which the tether passes on an upper side of the front panel of the airbag, and at least a portion of the tether may pass through the guide part and may be fixed to the front panel.

The guide part may surround the tether, and the tether may be movable within the guide part.

The guide part may be formed flat and have both ends sewn to the front panel of the airbag so that the tether is inserted into the center of the guide part and caught on the guide part.

The tether groove may be by cutting at least portions of the front panel of the airbag and the rear panel of the airbag from the lower side of the airbag to a center of the airbag and sewing the front panel of the airbag and the rear panel of the airbag along a cutting line.

At least a portion of the tether may be caught on the guide part, and the tether may extend in a direction in which the tether groove is disposed, may pass through the tether groove, and may be connected to the rear panel.

The airbag unit may include an inflator inserted into an insertion hole disposed in a center of the rear panel of the airbag, a center portion of the tether may be caught on the guide part, and both ends of the tether may be fixed to a periphery of the insertion hole.

The tether groove may include a plurality of tether grooves.

According to another aspect of the present invention, an airbag unit includes an airbag configured to be deployed toward a driver, and a tether connected to an outer side of the airbag to support the airbag. The airbag includes a front panel disposed on a driver side, and a rear panel connected to a rear surface of the front panel. A first guide part on which the tether is caught is disposed on an upper side of the front panel, a second guide part on which the tether is caught is disposed on a lower side of the airbag, and the tether passes through the first guide part, extends from the first guide part, passes through the second guide part, and is fixed to the rear panel of the airbag.

The first guide part may be disposed so that the tether passes therethrough in a horizontal direction, the second guide part may be disposed so that the tether passes therethrough in a vertical direction, and both ends of the tether may be fixed to a periphery of an inflator insertion hole formed in the rear panel.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
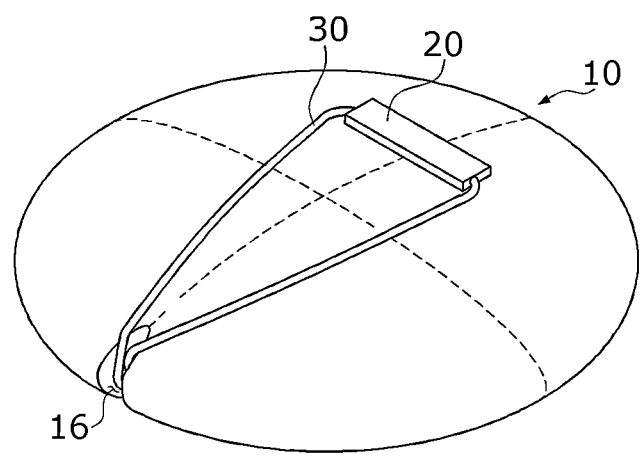
FIG. 1 is a perspective view of an airbag unit according to one embodiment of the present invention.

Exemplary embodiments of the present invention will be illustrated in the accompanying drawings and described in detail in the detailed description, but the embodiments may be changed and have many alternative forms. However, the present invention is not limited to specific embodiments and it should be understood to include all changes, equivalents, and substitutes included in the spirit and technical scope of the present invention. In the description of the present invention, when it is deemed that a detailed description of the related art may obscure the gist of the present invention, the detailed description will be omitted.

It should be understood that, although the terms "first," "second," etc. may be used herein to describe various elements, these elements are not limited by the terms. The terms are only used to distinguish one element from another. For example, a first element could be called a second element, and similarly, a second element could be called a first element, without departing from the scope of the present invention. As used herein, the term "and/or" includes any and all combinations of one or more of the associated listed items.

Terms used in the present specification are only used to describe specific exemplary embodiments and are not intended to limit the present invention. Singular forms used herein include plural forms unless explicitly indicated otherwise. It should be further understood that the term "comprise" or "have" used in this specification specifies the presence of stated features, numbers, operations, components, parts, or a combination thereof but does not preclude the presence or addition of one or more other features, numbers, operations, components, parts, or a combination thereof.

Furthermore, throughout the specification, when it is stated that components are "connected," this does not necessarily mean that two or more components are directly connected, but rather that they are indirectly connected through other components, connected physically or electrically, or referred to by different names based on their position or function, yet all are considered as being interconnected.

Additionally, when described as being formed or disposed "above or below" each component, "above or below" includes not only cases where two components are directly in contact with each other, but also cases where one or more other components are formed or disposed between the two components. Furthermore, when expressed as "above or below," it may include not only the upward direction but also the downward direction based on one component.

Hereinafter, embodiments of an airbag unit according to the present invention will be described in detail with reference to the accompanying drawings. In the description with reference to the accompanying drawings, identical or corresponding components will be assigned the same reference numerals, and redundant descriptions thereof will be omitted.

A driver's seat side airbag 10 may be deployed from a center of a rim of a steering wheel toward a driver to protect the driver in the event of an accident. In this case, the deployed airbag 10 may be supported by the steering wheel and support the driver without being pushed toward the front of the vehicle.

Recently, with the development of new vehicles such as electric vehicles or autonomous vehicles, structures that provide more space inside vehicles are being applied. By reducing the volume of interior components of the vehicle, space that is usable by the driver can be secured. Particularly, space can be secured by altering or reducing the structure of the steering wheel.

Accordingly, the upper rim or lower rim of the steering wheel may be reduced or bent so that the interior space in the vehicle can be secured. However, when a driver's seat side airbag 10 is deployed and the driver comes into contact with the airbag 10, the airbag 10 may not be sufficiently supported by the steering wheel, thereby insufficiently supporting the driver and being pushed forward.

The present invention provides an airbag unit which supports a driver without being pushed toward the front of a vehicle even in a steering wheel structure in which the airbag 10 is insufficiently supported such as when the steering wheel is reduced or at least partially removed.

Figure 2:
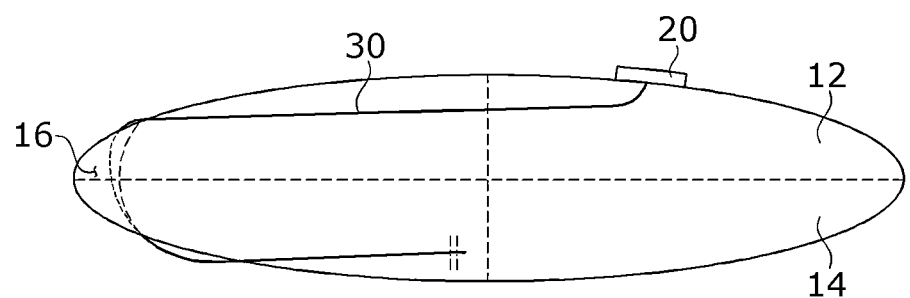
FIG. 2 is a view illustrating a side surface of the airbag unit according to the embodiment of the present invention.

FIG. 1 is a perspective view of an airbag unit according to an embodiment of the present invention, and FIG. 2 is a view illustrating a side surface of the airbag unit according to the embodiment of the present invention.

Referring FIGS. 1 and 2, the airbag unit according to the embodiment of the present invention may include an airbag 10 including a front panel 12 and a rear panel 14, a tether 30 connected to an outer side of the airbag 10 to support the airbag 10, and a guide part 20 for guiding the disposition of the tether 30.

When viewed from the front of the driver's seat side airbag 10, the airbag 10 may be formed in a circular shape, and the tether 30 may be connected to the outer side thereof. The tether 30 may be formed in a long string shape and support the outer side of the airbag 10 so that the airbag 10 is not pushed toward the front of the vehicle.

The airbag 10 may include the front panel 12 and the rear panel 14. The front panel 12 is disposed on a driver side to directly come into contact with and support the driver. The rear panel 14 is connected to the rear of the front panel 12 and may be inflated by filling an empty space formed by the front panel 12 and the rear panel 14 with gas discharged from an inflator.

The tether 30 may be connected to the front panel 12. The tether 30 may be at least partially connected and fixed to an upper side of the front panel 12. As shown in FIG. 1, the guide part 20 is disposed a predetermined distance upward from the center of the front panel 12, and the tether 30 may be fixed by the guide part 20. The tether 30 may extend from both sides of the guide part 20 downward to the lower side of the front panel 12 and both ends thereof may be connected to the rear surface of the airbag 10, that is, the rear panel 14.

A general driver's seat airbag 10 is circular. When the airbag 10 is circular, the tether 30 extending from the front panel 12 cannot be fixed in a process of connecting the tether 30 to the rear panel 14. Therefore, a tether groove 16 may be formed at a lower side of the airbag 10 so that the tether 30 is caught. The tether 30 may be connected to the rear panel 14 by passing through the tether groove 16 or pass through the lower side of the airbag 10 to be fixed without movement.

As shown in FIG. 2, both ends of the tether 30 may be fixed to the rear panel 14 or fixed to a periphery of an insertion hole 15 into which the inflator formed on the rear panel 14 is inserted. There is no limit to the way the tether 30 is fixed, and the tether 30 may be formed of a fabric material and sewn and fixed to the rear panel 14.

The tether 30 extends from an upper side of the front panel 12, passes through the tether groove 16 formed at a lower side of the airbag 10, and is connected to the rear panel 14 forming the rear surface of the airbag 10. When the airbag 10 is deployed so that the driver is supported by the airbag 10, the tether 30 may prevent the airbag 10 from being pushed toward the front of the vehicle.

In detail, generally, the driver's head comes into contact with the upper side of the airbag 10 when an accident occurs. The rear panel 14 is fixed to a module mounting part of the airbag 10 at the center of the driver's seat. When a force acts on the upper side of the airbag 10 in the forward direction, the tether 30 disposed to surround the lower side of the airbag 10 provides tension, thereby pulling the upper side of the airbag 10 downward. As a result, the airbag 10 receives the force in the direction of rotating downward so as to safely support the driver.

The tether 30 may be formed of a material, which does not easily stretch, to support the airbag 10 when the airbag 10 is pushed by the driver. In other words, the tether 30 may be made of fabric with low elasticity to immediately provide tension when the tether 30 supports the airbag 10, thereby supporting the airbag 10.

Figure 3:
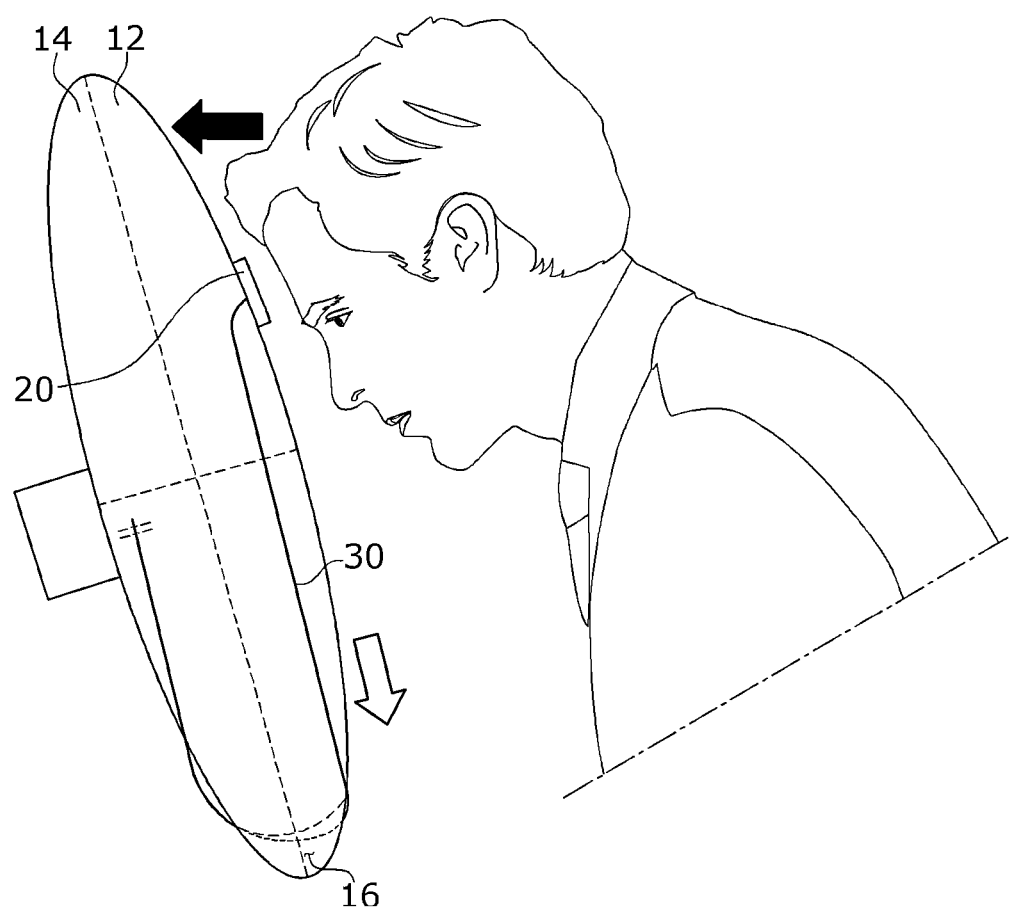
FIG. 3 is a view illustrating that a driver is supported by the airbag unit according to the embodiment of the present invention.

FIG. 3 is a view illustrating that a driver is supported by the airbag unit according to the embodiment of the present invention.

Referring to FIG. 3, when an accident occurs, the airbag 10 is deployed, and the driver may be pushed forward and come into contact with the airbag 10. The head of the driver comes into contact with an upper side of the airbag 10 to exert a forward force on the airbag 10. In this case, the tether 30 is fixed to one side of the rear panel 14, which is the rear of the airbag 10, and the rear panel 14 is fixed to a module side of an airbag 10 in the rear panel's initial position even when the airbag 10 is deployed.

Therefore, although a force is exerted to an upper side of the airbag 10 in the forward direction by the driver, the tether 30 is pulled and tension is applied downward. Thus, the airbag 10 is not pushed forward so as to safely support the driver.

Figure 4:
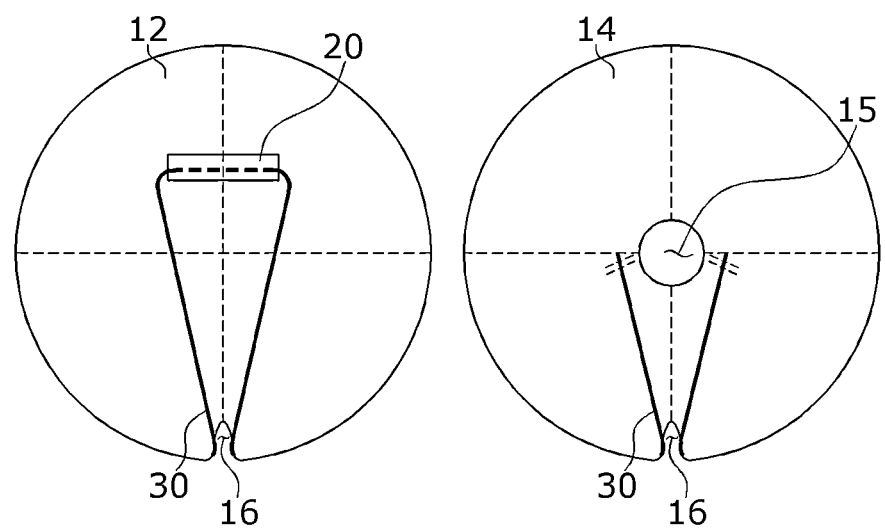
FIG. 4 is a view illustrating a front panel and a rear panel of the airbag unit according to the embodiment of the present invention.

FIG. 4 is a view illustrating the front panel and rear panel of the airbag unit according to the embodiment of the present invention.

FIG. 4 shows a structure of the front panel 12 and the rear panel 14 of the airbag unit according to the embodiment of the present invention. First, the guide part 20 is disposed on the upper side of the front panel 12 and configured to allow the tether 30 to be fixedly caught. In the embodiment of the present invention, the guide part 20 is formed of a quadrangular-shaped fabric and has upper and lower sides sewn to the front panel 12 to allow the tether 30 to be inserted into the center thereof, thereby fixing at least a portion of the tether 30.

Since only the upper and lower sides of the guide part 20 is sewn to the front panel 12 and the center is empty, the tether 30 may be inserted into the guide part 20 through one side of the guide part 20. The tether 30 may move within the guide part 20. The thin and long tether 30 is inserted into one side of the guide part 20 and exits the other side, and at least a portion thereof may be caught. Because the tether 30 is disposed to move within the guide part 20, when the tether 30 is pulled and receives a force, tension is concentrated on the guide part 20, which is the upper end of the tether 30, thereby supporting the airbag 10 so that it is not be pushed forward.

There are no limitations on the shape of the guide part 20, and any structure in which the tether 30 is disposed and fixed to an outer side of the front panel 12 may be applied. Furthermore, it is possible for the tether 30 to slide and move within the guide part 20, and alternatively, it is possible to fix the tether 30 to the guide part 20 so that the tether 30 is restrained. The guide part 20 may be formed of a fabric material and formed of the same material as the front panel 12 and the rear panel 14 that constitute the airbag 10.

Since the tether groove 16 is formed in the airbag 10, at least portions of the front panel 12 and the rear panel 14 may be bent to correspond to the shape of the tether groove 16. At least portions of the lower sides of the front panel 12 and the rear panel 14 may be bent toward their respective centers to form the tether groove 16. The front panel 12 and the rear panel 14 are sewn to each other along the edges thereof. When the airbag 10 is deployed, the bent shapes of the bent portions are inflated so that the tether 30 may be caught.

When the airbag 10 is deployed, gas supplied from the inflator is in a high temperature and pressure state so as to exert a strong force on the airbag 10. Therefore, a separate tether (not shown) for maintaining the shape of the tether groove 16 may be connected to the inside of the airbag 10 so that the airbag 10 is deployed while maintaining the shape of the tether groove 16.

In detail, because the separate tether disposed in the airbag 10 is disposed to connect the top of a recessed portion of the tether groove 16 with a portion of the inside of the airbag 10, even when strong pressure acts on the tether groove 16, the inside of the tether groove 16 may be held so that the airbag 10 is deployed while maintaining the shape of the tether groove 16.

The tether 30 extending from the both sides of the guide part 20 may be caught in the tether groove 16 disposed on the lower side of the front panel 12 along an outer surface of the front panel 12. The tether 30 extends toward the rear panel 14 along the outer sides of the front panel 12 and the rear panel 14 and may be fixed to the periphery of the inflator insertion hole 15 formed in the rear panel 14.

Since the rear panel 14 constitutes the rear surface of the airbag 10 and is disposed in a fixed position when the airbag 10 is deployed, the tether 30 is fixed to the rear panel 14 to support the entire airbag 10. Particularly, since the center portion of the rear panel 14 and the periphery of the insertion hole 15 formed in the center portion have the least movement when the airbag 10 is inflated, both ends of the tether 30 are fixed to the corresponding positions and may support the airbag 10.

Before the airbag 10 is deployed, the front panel 12 and the rear panel 14 are inserted into a module of the airbag 10 in a folded state. In this case, when the airbag 10 is deployed while the tether 30 is not disposed in the tether groove 16, the tether 30 may be separated from the tether groove 16. Therefore, an additional component may be provided to hold the tether 30 so that it is disposed in the tether groove 16 even when the airbag 10 is in the folded state.

Even when the airbag 10 is folded, a fixing part may be disposed at an end of the tether groove 16 so that the tether 30 is disposed in the tether groove 16. That is, after the tether 30 is caught in the tether groove 16, the fixing part is disposed at the end of the tether groove 16 to prevent the tether 30 from being separated from the tether groove 16.

Figure 5:
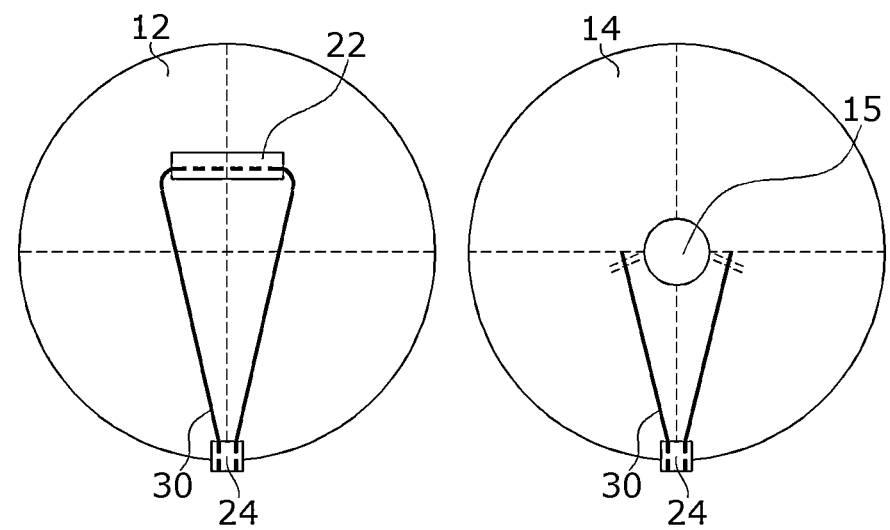
FIG. 5 is a view illustrating a front panel and a rear panel of an airbag unit according to another embodiment of the present invention.

FIG. 5 is a view illustrating a rear panel and a rear panel of an airbag unit according to another embodiment of the present invention.

Referring to FIG. 5, in the airbag unit according to another embodiment of the present invention, an airbag 10 includes a separate guide part 24 instead of a tether groove 16, thereby allowing a tether 30 to be fixed at a lower side of the airbag 10.

In the previous embodiment, the reason why the tether groove 16 is formed is that the tether 30 extends to the lower side of the airbag 10 to support the airbag 10. This is to prevent the tether 30 from sliding on an outer surface of the airbag 10 and changing its position.

Instead of forming a tether groove 16 on the lower side of the airbag 10, the above effects may be achieved by providing the separate guide part 24. A first guide part 22 is disposed on an upper side of the front panel 12 to at least partially fix the tether 30. The tether 30 disposed on the front panel 12 extends from both ends of the first guide part 22 and is disposed on the lower side of the airbag 10.

A second guide part 24 may be disposed on the lower side of the air bag 10 in a direction perpendicular to a longitudinal direction of the first guide part 22. At least a portion of the second guide part 24 is disposed on the front panel 12, and the remaining part may be disposed on the rear panel 14. That is, when the airbag 10 is viewed from the front, only a part of the second guide part 24 may be disposed on the front surface in a folded state, and the remaining part may be disposed on the rear surface.

The tether 30 may pass through the second guide part 24 on the lower side of the airbag 10 and may be disposed on an outer side of the rear panel 14. The tether 30 extending to the rear panel 14 is fixed to the periphery of the center of the rear panel 14 and may support the airbag 10.

The first guide part 22 and the second guide part 24 may each be formed of flat-shaped fabric. Both ends of the first guide part 22 and the second guide part 24 are fixed and sewn to the airbag 10, and center portions thereof are not fixed and sewn. The tether 30 may be inserted into the first guide part 22 and the second guide part 24 through the center portions. Further, the tether 30 may move within the first guide part 22 and second guide part 24 in a sliding manner. The first guide part 22 and the second guide part 24 may have the same size or may have different sizes. For example, the second guide part 24 may be longer than the first guide part 22, and half of the second guide part 24 may be connected to the front panel 12 and the other half thereof may be connected to the rear panel 14.

According to embodiments of the present invention, a tether of which one side is connected to a front panel and the other side is connected to a rear panel pulls an airbag downward when the airbag is deployed, and thus the driver can be safely supported by the airbag.

The various and beneficial advantages and effects of the present invention are not limited to the above-described content, and may be more easily understood through the description of specific embodiments of the present invention.

While specific embodiments of the present invention have been described, it will be understood by those skilled in the art that various modifications and changes can be made to the present invention without departing from the spirit and scope of the present invention as set forth in the claims below.

What is claimed is:

1. An airbag unit comprising:
an airbag configured to be deployed toward a driver; and
a tether connected to an outer side of the airbag to support the airbag,
wherein the airbag includes a front panel disposed on a driver side and a rear panel connected to a rear surface of the front panel,
a tether groove is disposed in a recessed portion of the airbag at a lower side of the airbag,
at least a portion of the tether is disposed on the front panel,
the tether passes through the tether groove, and
both ends of the tether are fixed to the rear panel so as to support the airbag when the airbag is deployed.

2. The airbag unit of claim 1, further comprising a guide part through which the tether passes on an upper side of the front panel of the airbag,
wherein at least a portion of the tether passes through the guide part and is fixed to the front panel.

3. The airbag unit of claim 2, wherein the guide part surrounds the tether, and
the tether is movable within the guide part.

4. The airbag unit of claim 3, wherein the guide part is flat and has both ends sewn to the front panel of the airbag so that the tether is inserted into a center of the guide part and caught on the guide part.

5. The airbag unit of claim 4, wherein the tether groove is formed by cutting at least portions of the front panel of the airbag and the rear panel of the airbag from the lower side of the airbag to a center of the airbag and sewing the front panel of the airbag and the rear panel of the airbag along a cutting line.

6. The airbag unit of claim 5, wherein at least a portion of the tether is caught on the guide part, and
the tether extends in a direction in which the tether groove is disposed, passes through the tether groove, and is connected to the rear panel.

7. The airbag unit of claim 6, further comprising an inflator inserted into an insertion hole disposed in a center of the rear panel of the airbag,
a center portion of the tether is caught on the guide part, and
both ends of the tether are fixed to a periphery of the insertion hole.

8. The airbag unit of claim 1, wherein the tether groove comprises a plurality of tether grooves.

9. An airbag unit comprising:
an airbag configured to be deployed toward a driver; and
a tether connected to an outer side of the airbag to support the airbag,
wherein the airbag includes a front panel disposed on a driver side and a rear panel connected to a rear surface of the front panel,
a first guide part on which the tether is caught is disposed on an upper side of the front panel,
a second guide part on which the tether is caught is disposed on a lower side of the airbag, and
the tether is passes through the first guide part, extends from the first guide part, passes through the second guide part, and is fixed to the rear panel of the airbag.

10. The airbag unit of claim 9, wherein the first guide part is disposed so that the tether passes therethrough in a horizontal direction,
the second guide part is disposed so that the tether passes therethrough in a vertical direction, and
both ends of the tether are fixed to a periphery of an inflator insertion hole disposed in the rear panel of the airbag.

* * * * *